(12) United States Patent
Kim et al.

(10) Patent No.: US 10,700,324 B2
(45) Date of Patent: Jun. 30, 2020

(54) BATTERY CELL HAVING MAIN GAS DISCHARGE TUBE AND METHOD FOR MANUFACTURING THE SAME

(71) Applicant: LG CHEM, LTD., Seoul (KR)

(72) Inventors: Cho Long Kim, Daejeon (KR); Yong Su Choi, Daejeon (KR); Sang Hun Kim, Daejeon (KR); Sang Suk Jung, Daejeon (KR); Won Pill Hwang, Daejeon (KR); Yong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 232 days.

(21) Appl. No.: 15/565,854

(22) PCT Filed: Jun. 14, 2016

(86) PCT No.: PCT/KR2016/006305
§ 371 (c)(1),
(2) Date: Oct. 11, 2017

(87) PCT Pub. No.: WO2017/039126
PCT Pub. Date: Mar. 9, 2017

(65) Prior Publication Data
US 2018/0114964 A1    Apr. 26, 2018

(30) Foreign Application Priority Data

Sep. 1, 2015  (KR) .................. 10-2015-0123728

(51) Int. Cl.
*H01M 2/12*    (2006.01)
*H01M 2/06*    (2006.01)
(Continued)

(52) U.S. Cl.
CPC ......... *H01M 2/1264* (2013.01); *H01M 2/021* (2013.01); *H01M 2/0202* (2013.01);
(Continued)

(58) Field of Classification Search
CPC .... H01M 2/1264; H01M 2/021; H01M 10/04; H01M 2/0267; H01M 2/06; H01M 2/12;
(Continued)

(56) References Cited

U.S. PATENT DOCUMENTS

| 6,703,157 B1 | 3/2004 | Shoji et al. |
| 2005/0069759 A1 | 3/2005 | Shimamura et al. |

(Continued)

FOREIGN PATENT DOCUMENTS

| JP | 2005-129487 A | 5/2005 |
| JP | 2006-86049 A | 3/2006 |

(Continued)

OTHER PUBLICATIONS

Extended European Search Report, dated Sep. 11, 2018, for European Applitation No. 16842092.5.
(Continued)

*Primary Examiner* — Gary D Harris
(74) *Attorney, Agent, or Firm* — Birch, Stewart, Kolasch & Birch, LLP

(57) ABSTRACT

The present invention relates to a battery cell. The battery cell comprises: an electrode assembly provided with an electrode tab; a case which accommodates the electrode assembly and of which at least a portion of an edge is sealed to provide a sealing surface; an electrode lead coupled to the electrode tab and led out of the case; a lead film disposed on each of top and bottom surfaces of the lead electrode disposed on the sealing surface of the case and coupled together with the sealing surface; and a main gas discharge tube disposed in the case and having one end buried in the lead film.

7 Claims, 12 Drawing Sheets

(51) Int. Cl.
  *H01M 2/02* (2006.01)
  *H01M 10/04* (2006.01)
  *H01M 2/08* (2006.01)
(52) U.S. Cl.
  CPC .......... *H01M 2/0267* (2013.01); *H01M 2/06* (2013.01); *H01M 2/08* (2013.01); *H01M 2/12* (2013.01); *H01M 10/04* (2013.01); *H01M 10/0436* (2013.01); *H01M 2/0275* (2013.01); *H01M 2220/30* (2013.01)
(58) Field of Classification Search
  CPC .. H01M 10/0436; H01M 2/08; H01M 2/0202; H01M 2/0275; H01M 2220/30
  USPC .......................................................... 429/53
  See application file for complete search history.

(56) References Cited

U.S. PATENT DOCUMENTS

| | | | |
|---|---|---|---|
| 2009/0081542 A1 | 3/2009 | Yageta et al. | |
| 2010/0255368 A1 | 10/2010 | Park et al. | |
| 2012/0064381 A1 | 3/2012 | Yageta et al. | |
| 2014/0011060 A1 | 1/2014 | Yang et al. | |
| 2014/0147712 A1* | 5/2014 | Lee | H01M 2/0212 429/61 |
| 2014/0199581 A1 | 7/2014 | Ryu et al. | |

FOREIGN PATENT DOCUMENTS

| | | |
|---|---|---|
| JP | 2007-311163 A | 11/2007 |
| JP | 2012-138368 A | 7/2012 |
| JP | 5825448 B2 | 12/2015 |
| KR | 2001-0110773 A | 12/2001 |
| KR | 10-2007-0065540 A | 6/2007 |
| KR | 10-2009-0095334 A | 9/2009 |
| KR | 10-0958649 B1 | 5/2010 |
| KR | 10-2014-0091441 A | 7/2014 |
| WO | WO 2006/098242 A1 | 9/2006 |

OTHER PUBLICATIONS

International Search Report (PCT/ISA/210) issued in PCT/KR2016/006305, dated Sep. 20, 2016.

* cited by examiner

BATTERY CELL HAVING MAIN GAS DISCHARGE TUBE AND METHOD FOR MANUFACTURING THE SAME

CROSS-REFERENCE TO RELATED APPLICATION

The present application claims the benefit of the priority of Korean Patent Application No. 10-2015-0123728, filed on Sep. 1, 2015, which is hereby incorporated by reference in its entirety.

TECHNICAL FIELD

The present invention relates to a battery cell and a method for manufacturing the same, and more particularly, to a battery cell in which a gas discharge tube is built and a method for manufacturing the same.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

The secondary battery according to the related art comprises a plurality of battery cells. Each of the battery cells comprises an electrode assembly, an electrolyte, and a pouch in which the electrode assembly and the electrolyte are accommodated.

Here, the battery cell is manufactured by accommodating the electrode assembly and the electrolyte in the pouch and then sealing an edge of the pouch. The manufactured battery cell is subjected to a charging/discharging process to improve battery performance.

However, in the battery cell according to the related art, a gas is generated in the pouch when the charging/discharging process is performed. Thus, there is a problem that the pouch is exploded while swelling.

To solve the abovementioned problems, the prevent invention provides a battery cell in which a gas discharge tube is built in one side of a battery cell to quickly discharge a gas generated in the battery cell through the gas discharge tube and a method for manufacturing the same.

Technical Solution

To achieve the abovementioned object, a battery cell according to the present invention comprises: an electrode assembly provided with an electrode tab; a case which accommodates the electrode assembly and of which at least a portion of an edge is sealed to provide a sealing surface; an electrode lead coupled to the electrode tab and led out of the case; a lead film disposed on each of top and bottom surfaces of the lead electrode disposed on the sealing surface of the case and coupled together with the sealing surface; and a main gas discharge tube disposed in the case and having one end buried in the lead film, wherein a portion of the lead film is cut so that the one end of the main gas discharge tube is exposed to the outside to discharge the gas in the case to the outside through the main gas discharge tube that is exposed to the outside.

The one end of the main gas discharge tube exposed to the outside may be sealed and finished together with the lead film by thermally fusing the cut lead film again.

The main gas discharge tube may be made of a material having heat resistance and insulation.

The one end of the main gas discharge tube may be inserted into the lead film disposed at a side portion of the electrode lead.

The battery cell may further comprise an auxiliary gad discharge tube disposed in the case and having one end buried in the sealing surface of the case.

A portion of the sealing surface may be cut so that the one end of the auxiliary gas discharge tube is exposed to the outside to discharge the gas in the case to the outside through the auxiliary gas discharge tube.

The one end of the auxiliary gas discharge tube, which is exposed to the outside, may be sealed and finished together with the sealing surface by thermally fusing the cut sealing surface again.

A method for manufacturing a battery cell according to the present invention comprises: a preparation step (S10) of preparing an electrode assembly to which an electrode lead is coupled; an accommodation step (S20) of accommodating the electrode assembly in a case so that an end of the electrode lead is led out of the case; a disposition step (S30) of disposing a lead film on each of top and bottom surfaces of the electrode lead disposed on a sealing surface of the case; a burying step (S40) of burying one end of a main gas discharge tube in the lead film in a state in which the main gas discharge tube is disposed in the case; and a sealing step (S50) of thermally fusing the entire sealing surface of the case to complete the battery cell.

After the sealing step (S50), the method may further comprise: a charging/discharging step (S60) of charging/discharging the completed battery cell; and a gas discharge step (S70) of discharging a gas generated in the battery cell, in which the charging/discharging is completed, to the outside, wherein, in the gas discharge step (S70), a portion of the lead film is cut so that the one end of the main gas discharge tube is exposed to the outside to discharge the gas in the case to the outside through the exposed one end of the main gas discharge tube.

After the gas discharge step (S70), the method may further comprise a resealing step (S80) of thermally fusing the lead film, in which the one end of the main gas discharge tube is disposed, to seal the one end of the main gas discharge tube.

In the burying step (S40), an auxiliary gas discharge tube may be further disposed in the case, wherein one end of the auxiliary gas discharge tube may be buried so that the one end is not exposed to the outside of the sealing surface of the case.

In the sealing step (S50), the one end of the auxiliary gas discharge tube may be sealed together with the sealing surface by thermally fusing the entire sealing surface of the case.

In the gas discharge step (S70), the sealing surface may be cut so that the one end of the auxiliary gas discharge tube is exposed to the outside to additionally discharge the gas in the case through the auxiliary gas discharge tube.

In the resealing step (S80), the cut sealing surface may be thermally fused to seal the one end of the auxiliary gas discharge tube together.

Advantageous Effects

The present invention has effects as follows.

First: the battery cell in which the gas discharge tube is built may be provided to expose the gas discharge tube to the outside when the charging/discharging is performed, thereby stably discharging the gas generated in the battery cell.

Second: the gas discharge tube exposed to the outside may be sealed together with the battery cell when the battery cell is resealed, and thus, the gas discharge tube may be stably finished.

Third: the gas discharge tube may be built in the battery cell. Here, the one end of the gas discharge tube may be buried in the lead film. Thus, the gas discharge tube may be exposed to the outside by cutting the lead film to improve the use convenience.

Forth: the auxiliary gas discharge tube may be further provided in the battery cell to quickly and completely discharge the gas within the battery cell.

BRIEF DESCRIPTION OF THE DRAWINGS

FIG. 6 is a view illustrating a preparation step of preparing an electrode assembly, FIG. 7 is a view illustrating an accommodation step of accommodating the electrode assembly in a case, FIG. 8 is a view illustrating a disposition step of disposing a lead film on an electrode lead, FIG. 9 is a view illustrating a burying step of burying a gas discharge tube, FIG. 10 is a view illustrating a gas discharge step of discharging a gas to the gas discharge tube, and FIGS. 11 and 12 are views illustrating a resealing step of resealing the gas discharge tube and the auxiliary gas discharge tube.

MODE FOR CARRYING OUT THE INVENTION

Figure 1:
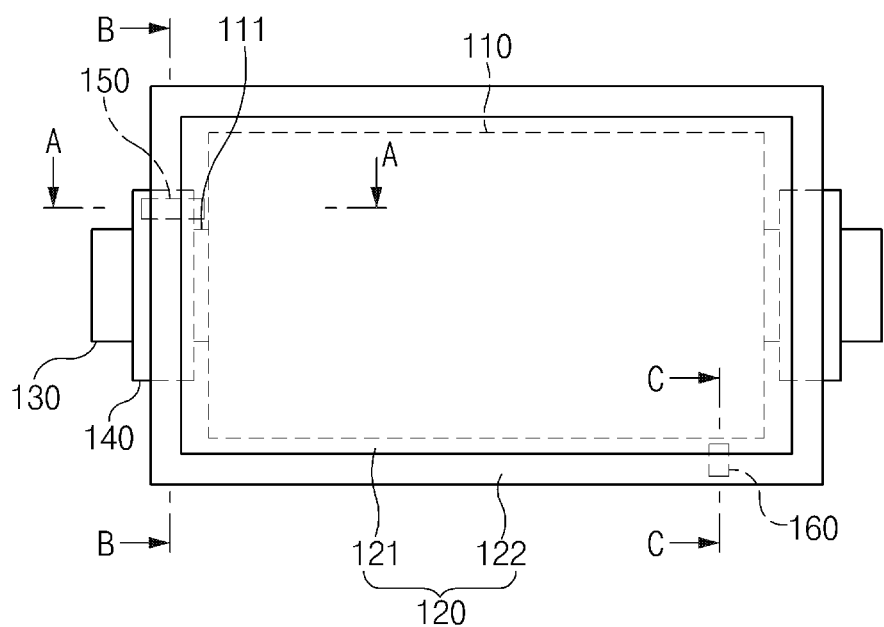
FIG. 1 is a plan view of a battery cell according to the present invention.
Figure 2:
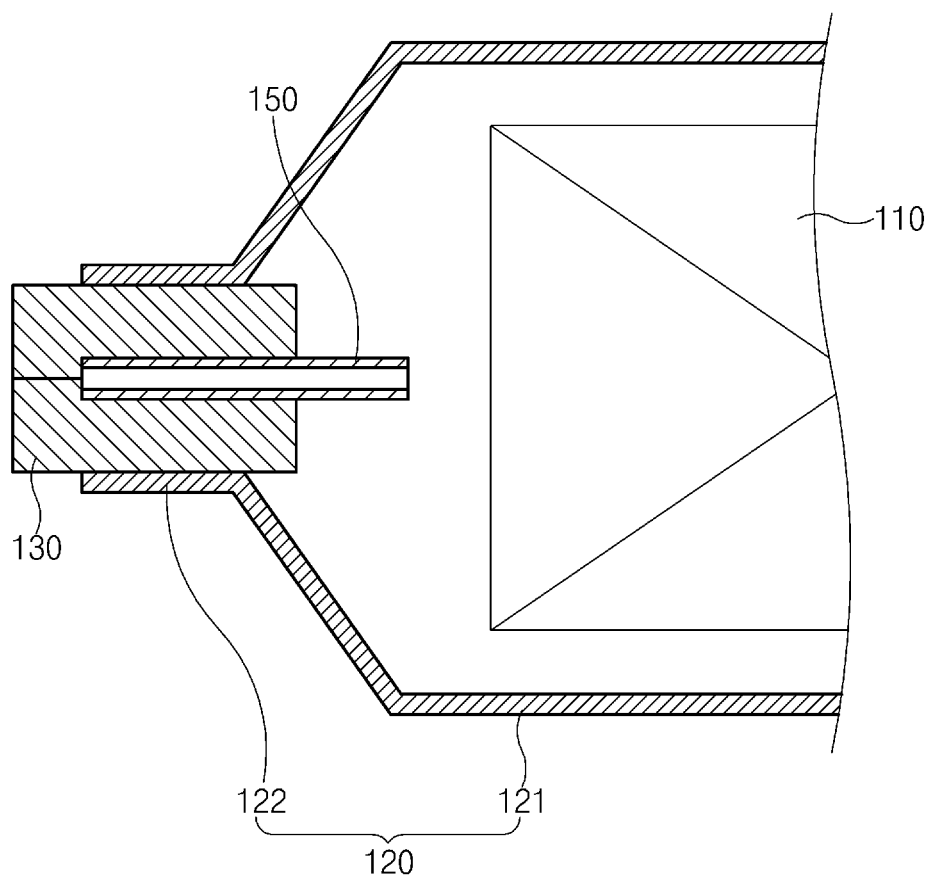
FIG. 2 is a cross-sectional view taken along line A-A of FIG. 1.
Figure 3:
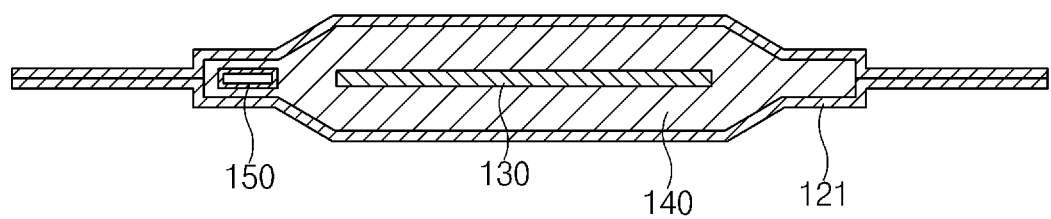
FIG. 3 is a cross-sectional view taken along line B-B of FIG. 1.
Figure 4:
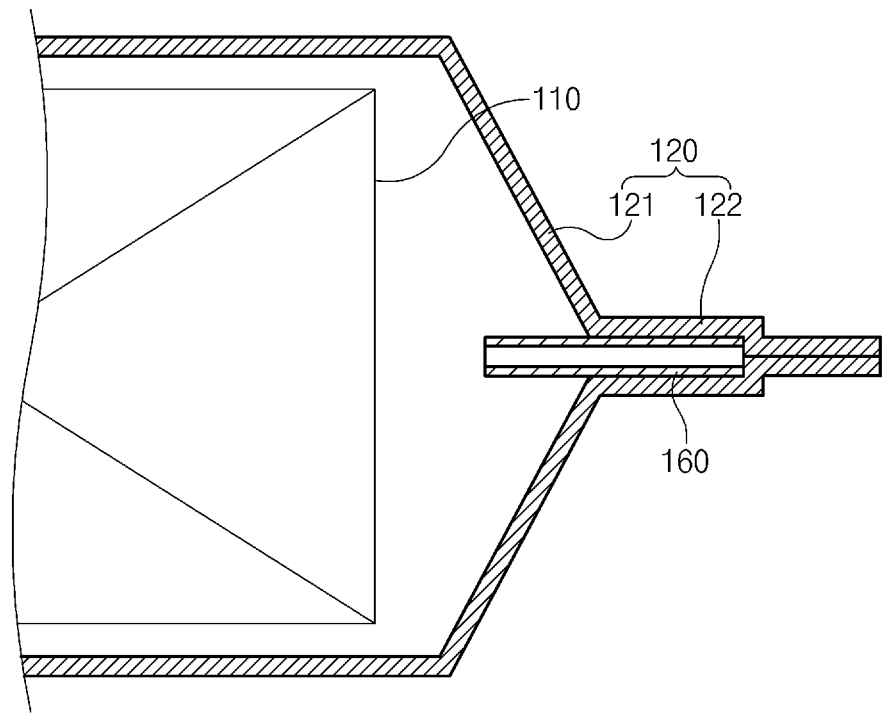
FIG. 4 is a cross-sectional view taken along line C-C of FIG. 1.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a battery cell according to the present invention comprise an electrode assembly 110 on which an electrode tab 111 is disposed, a case 120 which accommodates the electrode assembly 110 and of which at least a portion of an edge is sealed to provide a sealing surface 122, an electrode lead 130 coupled to the electrode tab 111 to lead out of the case 120, a lead film 140 disposed on each of top and bottom surfaces of the electrode lead 130 disposed on the sealing surface 122 of the case 120 and coupled to the sealing surface together, and a main gas discharge tube 150 disposed inside the case 120 and having one end buried in the lead film 140.

The electrode assembly 110 comprises first and second electrodes, which have polarities different from each other, and a separator disposed between the first and second electrodes. Also, an electrode tab 111 is disposed on each of the first and second electrodes.

The case 120 comprises an accommodation part 121 in which the electrode assembly 110 is accommodated and the sealing surface 122 disposed along an edge of the accommodation part 121 and thermally fused to seal the accommodation part 121.

The electrode lead 130 is coupled to the electrode tab 111 of the electrode assembly 110 and has a front end disposed to be exposed to the outside of the case 120.

The lead film 140 improves sealability between the electrode lead 130 and the case 120 and is disposed on each of top and bottom surfaces of the electrode lead 130 disposed on the sealing surface 122 of the case 120.

Here, front and rear surfaces of the lead film 140 extends to be exposed to the outside (left and right sides when viewed in FIG. 1) of the sealing surface 122 so as to improve the sealability between the lead film 140 and the sealing surface 122. A side portion of the lead film 140 extends to a lateral direction (a longitudinal direction of the sealing surface) of the lead film 140 so that a gap is not generated between the lead film 140 and the sealing surface 122.

The main gas discharge tube 150 discharges the gas generated in the sealed battery cell. The main gas discharge tube 150 has a flat cylindrical shape, is built in the case 120, and has one end that is buried in the lead film 140. Here, the main gas discharge tube 150 may have one end buried up to the lead film 140 exposed to the outside of the sealing surface 122. Thus, the one end of the main gas discharge tube 150 may be exposed to the outside by only cutting the lead film 140.

Also, the main gas discharge tube 150 is buried in the lead film 140 disposed at the side portion of the electrode lead 130. This is done because the lead film 140 is easily cut, and the sealability between the lead film 140 and the electrode lead 130 is maintained even though the lead film 140 is cut.

As described above, the main gas discharge tube 150 is provided in the state of being built in the case 120. When a gas is generated in the case 120, the lead film 140 may be cut to expose the main gas discharge tube. Thus, the gas in the case 120 may be discharged to the outside through the main gas discharge tube 150 and then removed from the inside of the case 120.

When the gas in the case 120 is completely removed, the one end of the main gas discharge tube 150, which is exposed to the outside, is sealed and finished together with the lead film 140 by thermally fusing the lead film 140 again.

The main gas discharge tube 150 is made of a material having heat resistance and insulation to prevent the main gas discharge tube 150 from being damaged by the electrolyte and the gas generated in the case 120.

The battery cell according to the present invention further comprises an auxiliary gas discharge tube 160 buried in the sealing surface 122 of the case 120.

That is, although the main gas discharge tube 150 quickly discharges the gas in the case 120 on which the lead film 140 is disposed, the gas in the case 120 disposed on an opposite side of the lead film 140 may remain without being discharged. Thus, the auxiliary gas discharge tube 160 may be built in the sealing surface 122 of the case 120, and the gas remaining in the case 120 may be completely discharged through the auxiliary gas discharge tube 160.

The auxiliary gas discharge tube 160 is disposed in the case 120 and has one end buried in the sealing surface 122 of the case 120. Here, a portion of the sealing surface 122 is cut so that the auxiliary gas discharge tube 160 is exposed to the outside to discharge the gas in the case 120 to the outside through the auxiliary gas discharge tube 160.

The one end of the auxiliary gas discharge tube 160, which is exposed to the outside, may be sealed and finished together with the sealing surface 122 by thermally fusing the cut sealing surface 122 again. Thus, the auxiliary gas discharge tube may be sealed without using a separate additional device.

A method for manufacturing the battery cell comprising the above-described constituents will be described below.

Figure 5:
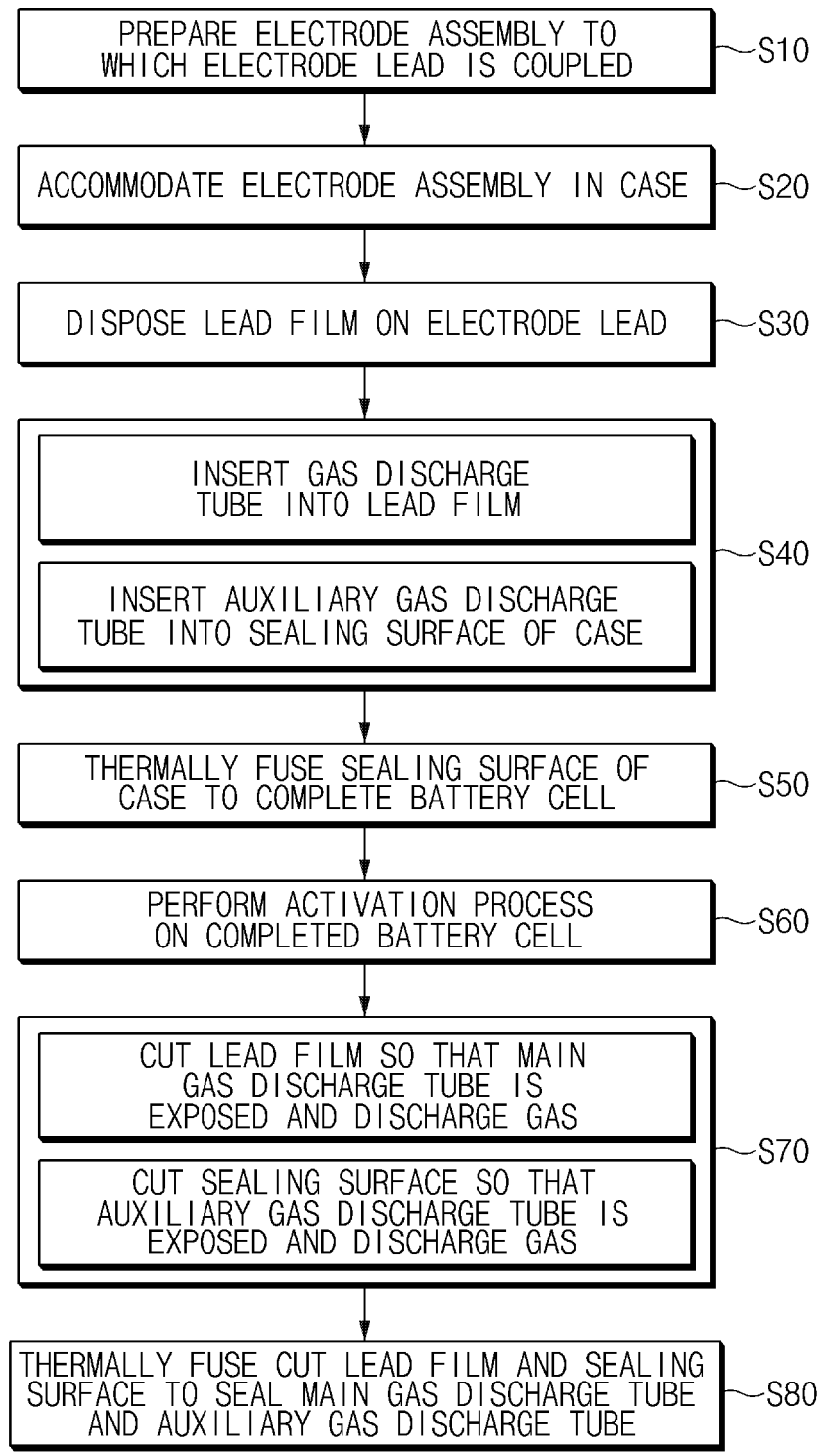
FIG. 5 is a flowchart illustrating a method for manufacturing the battery cell according to the present invention.

As illustrated in FIG. 5, a method for manufacturing the battery cell according to the present invention comprises a preparation step (S10) of preparing an electrode assembly 110 to which an electrode lead 130 is coupled, an accommodation step (S20) of accommodating the electrode assembly 110 in a case 120 so that an end of the electrode lead 130 is led out of the case 120, a disposition step (S30) of disposing a lead film 140 on each of top and bottom surfaces of the electrode lead 130 disposed on a sealing surface 122 of the case 120, a burying step (S40) of burying one end of a main gas discharge tube 150 in the lead film 140 in a state in which the main gas discharge tube 150 is disposed in the case 120, a sealing step (S50) of thermally fusing the entire sealing surface 122 of the case 120 to complete the battery cell, a charging/discharging step (S60) of charging/discharging the completed battery cell, a gas discharge step (S70) of discharging a gas generated in the battery cell, in which the charging/discharging is completed, to the outside through the main gas discharge tube 150, and a resealing step (S80) of thermally fusing the lead film 140, in which the one end of the main gas discharge tube 150 is disposed, to seal the one end of the main gas discharge tube 150.

Figure 6:
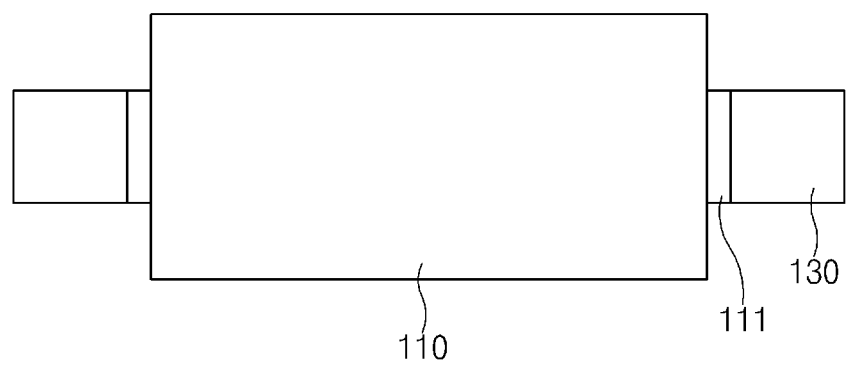
FIGS. 6 to 12 are views illustrating a method for manufacturing the battery cell according to the present invention.

As illustrated in FIG. 6, the preparation step (S10) is a step of preparing the electrode assembly 110. A first electrode and a second electrode, which have polarities different from each other, are wound with a separator therebetween to manufacture the electrode assembly 100. Also, the electrode lead 130 is coupled to an electrode tab 111 disposed on the electrode of the manufactured electrode assembly 110. Thus, the electrode assembly 110 is prepared through the above-described processes.

Figure 7:
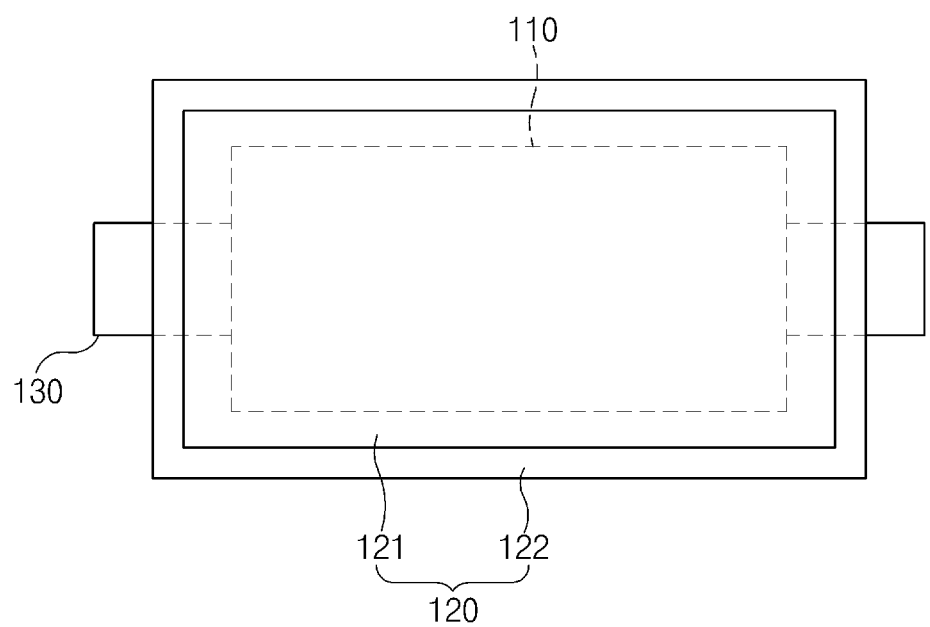

As illustrated in FIG. 7, the accommodation step (S20) is a step of accommodating the prepared electrode assembly in the case. Here, the electrode assembly 110 is accommodated in the case 120 so that one end of the electrode lead 130 is exposed to the outside of the case 120.

Figure 8:
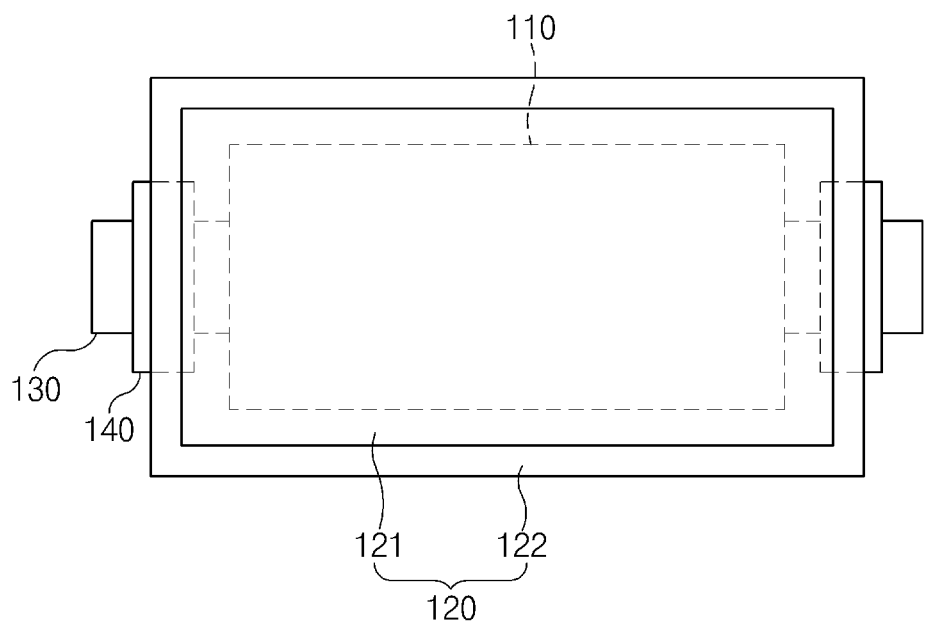

As illustrated in FIG. 8, the disposition step (S30) is a step of disposing the lead film. Here, the lead film 140 is disposed on each of the top and bottom surfaces of the electrode lead 130 disposed on the sealing surface 122 of the case 120. Here, the lead film 140 has a width greater than that of the sealing surface 122 to improve sealability.

Figure 9:
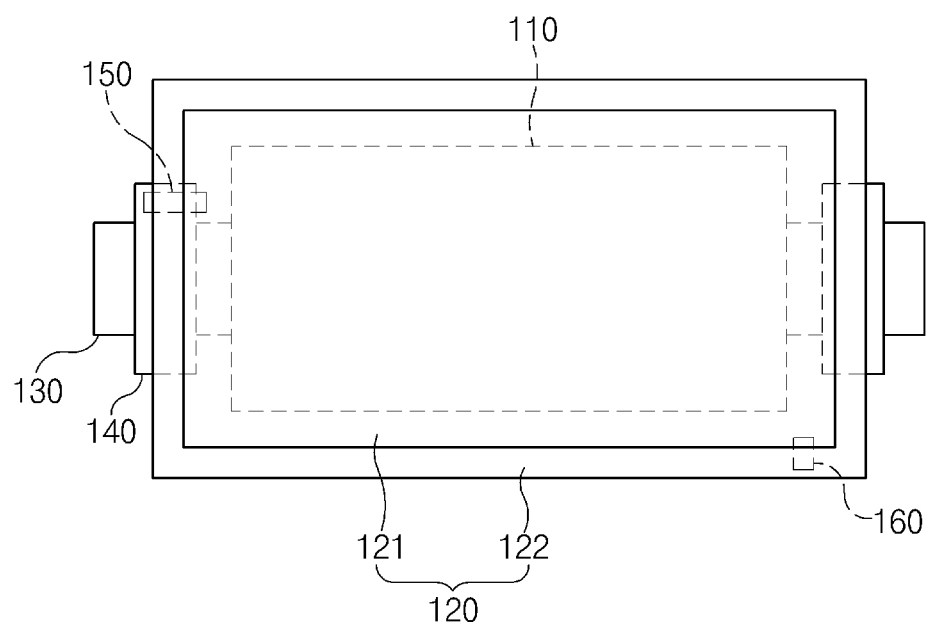

As illustrated in FIG. 9, the burying step (S40) is a step of embedding the main gas discharge tube and the auxiliary gas discharge tube. Here, the one end of the main gas discharge tube 150 is buried in the lead film 140 in the state of being built in the accommodation part 121 of the case 120. Here, the one end of the main gas discharge tube 150 is inserted to be buried up to the lead film 140 that is exposed to the outside of the sealing surface 122. Particularly, the gas discharge tube 150 is buried in the lead film 140 disposed at a side portion of the electrode lead 130 to improve external exposure and sealability of the main gas discharge tube 150.

Also, one end of the auxiliary gas discharge tube 160 is buried in the sealing surface 122 in a state of being built in the accommodation part 121 of the case 120.

The sealing step (S50) is a step of sealing the case 120. Here, the entire sealing surface 122 of the case 120 is thermally fused and sealed. Thus, the lead film 140 and the one end of the main gas discharge tube 150 are coupled together with the sealing surface 122. Also, the one end of the auxiliary gas discharge tube 160 is coupled together with the sealing surface 122.

Here, when the sealing step (S50) is completed, the battery case that is not charged is completed, and then, the battery cell is charged and discharged and thus activated.

That is, the charging/discharging step (S60) is a step for charging/discharging the battery cell. Here, the battery cell is charged and discharged through the electrode lead 130. Here, when the battery cell is charged and discharged, a gas is generated in the case 120. Thus, the gas discharge step (S70) for discharging the gas in the case 120 to the outside is performed.

Figure 10:
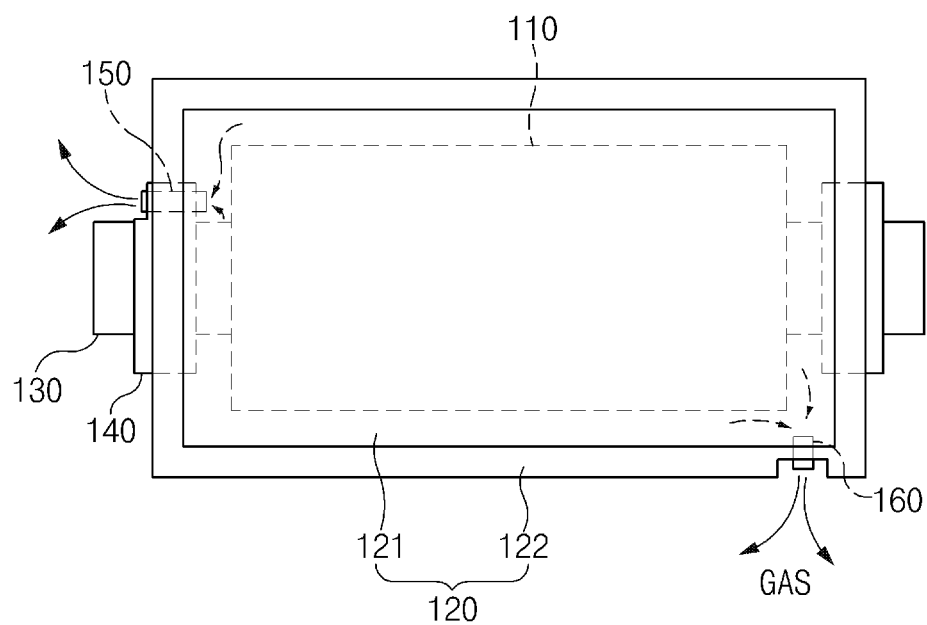

As illustrated in FIG. 10, in the gas discharge step (S70), the lead film 140 in which the main gas discharge tube 150 is disposed is cut to expose the main gas discharge tube 150 to the outside, and simultaneously, the gas in the case 120 is discharged to the outside through the main gas discharge tube 150.

Here, the gas may remain in the case 120. Thus, the sealing surface 122 in which the auxiliary gas discharge tube 160 is disposed is additionally cut to expose the auxiliary gas discharge tube 160 to the outside. As a result, the gas remaining the case 120 may be discharged to the outside through the auxiliary gas discharge tube 160.

When the gas is completely discharged, the resealing step (S80) of sealing the main gas discharge tube 150 and the auxiliary gas discharge tube 160 is performed.

Figure 11:
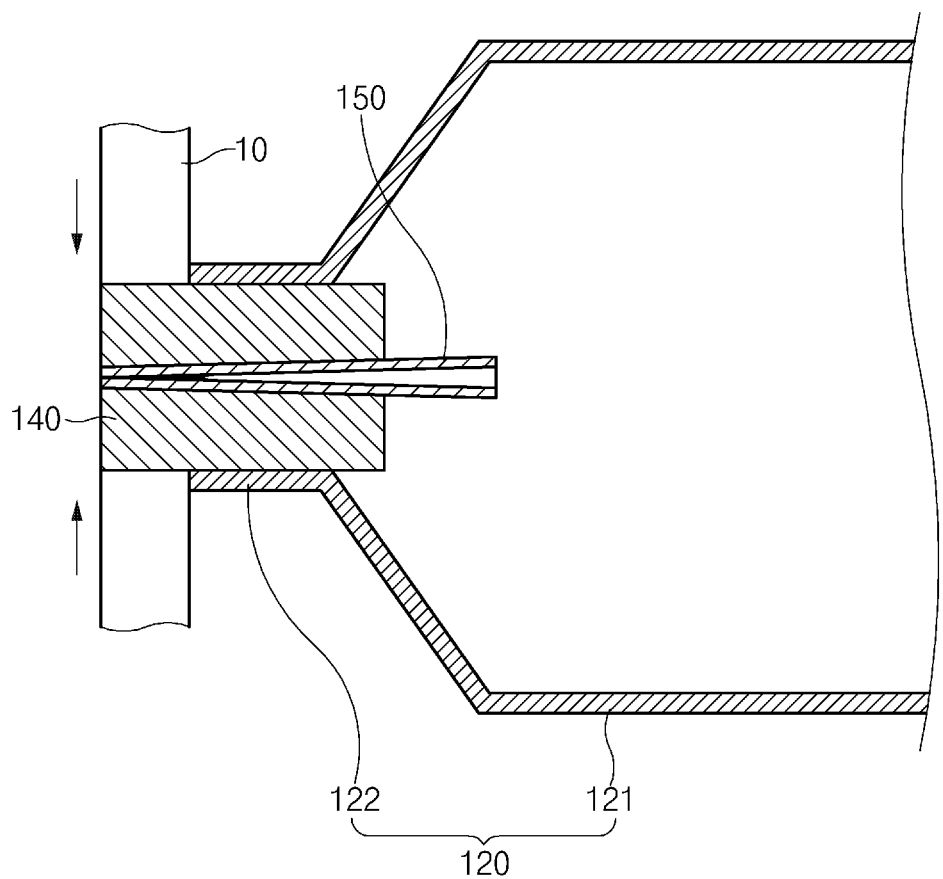

As illustrated in FIG. 11, in the resealing step (S80), the lead film 140 in which the main gas discharge tube 150 is disposed is thermally fused and resealed. Here, the main gas discharge tube 150 is sealed and finished together with the lead film 140.

Figure 12:
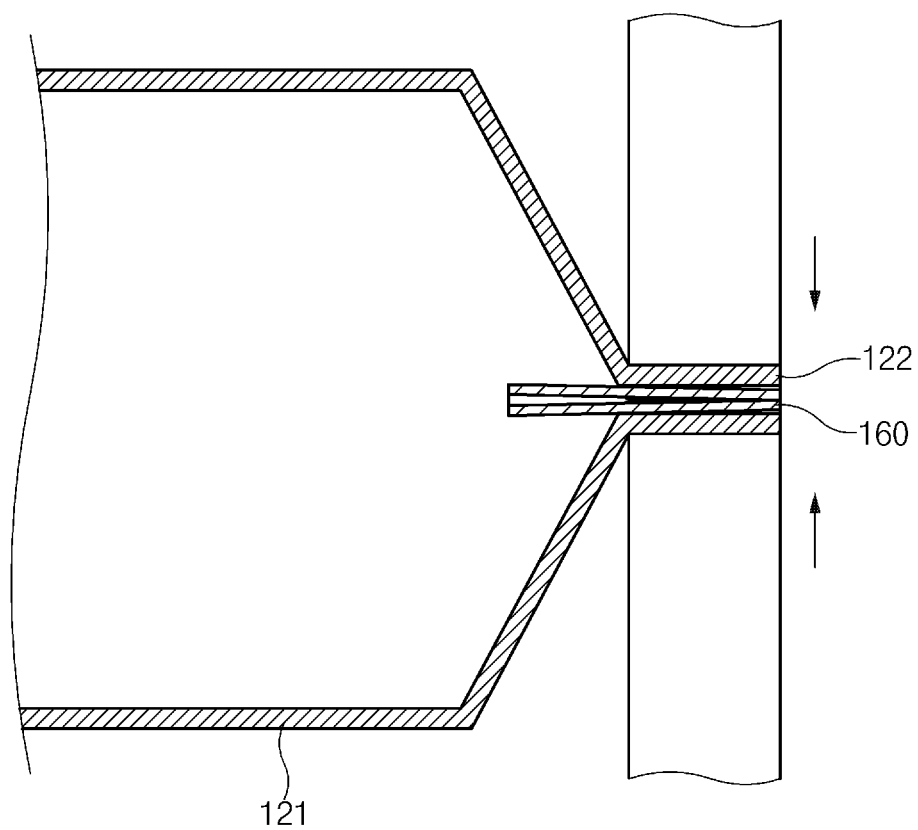

Also, as illustrated in FIG. 12, the sealing surface 122 in which the auxiliary gas discharge tube 160 is disposed is thermally fused and resealed. Here, the auxiliary gas discharge tube 160 is sealed and finished together with the sealing surface 122.

Thus, in the battery cell according to the present invention, the gas generated in the case when the charging/discharging is performed may be discharged to the outside through the main gas discharge tube and the auxiliary gas discharge tube. Particularly, since the gas is discharged through the tubes, the gas may be more stably discharged.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery cell comprising:
   an electrode assembly provided with an electrode tab;
   a case which accommodates the electrode assembly and of which at least a portion of an edge is sealed to provide a sealing surface;
   an electrode lead coupled to the electrode tab and led out of the case;

a lead film disposed on each of top and bottom surfaces of the lead electrode disposed on the sealing surface of the case and coupled together with the sealing surface; and a main gas discharge tube disposed in the case and having one end buried in the lead film, wherein a portion of the lead film is cut so that the one end of the main gas discharge tube is exposed to the outside to discharge the gas in the case to the outside through the main gas discharge tube that is exposed to the outside.

2. The battery cell of claim 1, wherein the one end of the main gas discharge tube exposed to the outside is sealed and finished together with the lead film by thermally fusing the cut lead film after the portion of the lead film is cut.

3. The battery cell of claim 1, wherein the main gas discharge tube is made of an insulative material.

4. The battery cell of claim 1, wherein the one end of the main gas discharge tube is inserted into the lead film disposed at a side portion of the electrode lead.

5. The battery cell of claim 1, further comprising an auxiliary gas discharge tube disposed in the case and having one end buried in the sealing surface of the case.

6. The battery cell of claim 5, wherein a portion of the sealing surface is cut so that the one end of the auxiliary gas discharge tube is exposed to the outside to discharge the gas in the case to the outside through the auxiliary gas discharge tube.

7. The battery cell of claim 6, wherein the one end of the auxiliary gas discharge tube, which is exposed to the outside, is sealed and finished together with the sealing surface by thermally fusing the cut sealing surface after the portion of the sealing surface is cut.

* * * * *